(12) United States Patent
Johnson et al.

(10) Patent No.: US 10,484,479 B2
(45) Date of Patent: Nov. 19, 2019

(54) INTEGRATION OF QUANTUM PROCESSING DEVICES WITH DISTRIBUTED COMPUTERS

(71) Applicant: QC Ware Corp., Moffett Field, CA (US)

(72) Inventors: Matthew C. Johnson, Palo Alto, CA (US); David A. B. Hyde, San Carlos, CA (US); Peter McMahon, Menlo Park, CA (US); Kin-Joe Sham, Blaine, MN (US); Kunle Tayo Oguntebi, Mountain View, CA (US)

(73) Assignee: QC WARE CORP., Moffett Field, CA (US)

( * ) Notice: Subject to any disclaimer, the term of this patent is extended or adjusted under 35 U.S.C. 154(b) by 234 days.

(21) Appl. No.: 15/415,865

(22) Filed: Jan. 26, 2017

(65) Prior Publication Data
US 2017/0223143 A1    Aug. 3, 2017

Related U.S. Application Data

(60) Provisional application No. 62/289,322, filed on Jan. 31, 2016.

(51) Int. Cl.
| | |
|---|---|
| *G06F 9/54* | (2006.01) |
| *H04L 29/08* | (2006.01) |
| *G06N 10/00* | (2019.01) |

(52) U.S. Cl.
CPC ............ *H04L 67/125* (2013.01); *G06F 9/541* (2013.01); *G06N 10/00* (2019.01)

(58) Field of Classification Search
None
See application file for complete search history.

(56) References Cited

U.S. PATENT DOCUMENTS

| | | |
|---|---|---|
| 6,671,681 B1 | 12/2003 | Emens et al. |
| 7,219,018 B2 | 5/2007 | Vitaliano et al. |
| | (Continued) | |

FOREIGN PATENT DOCUMENTS

WO    WO 2016/089711 A1    6/2016

OTHER PUBLICATIONS

PCT International Search Report and Written Opinion, PCT Application No. PCT/US17/15488, dated Apr. 20, 2017, 12 pages.
(Continued)

*Primary Examiner* — Shih-Wei Kraft
(74) *Attorney, Agent, or Firm* — Fenwick & West LLP

(57) ABSTRACT

Quantum processing devices are integrated with conventional distributed computing paradigms. In one aspect, ideas from classical distributed and high-performance computing are brought into the quantum processing domain. Various architectures and methodologies enable the bilateral integration of quantum processing devices and distributed computers. In one aspect, a system is composed of a high-level API and library, a quantum data model, and a set of software processes to prepare this data model for computation on a quantum processing device and to retrieve results from the quantum processing device. This provides a way for distributed computing software frameworks to integrate one or more quantum processing devices into their workflow.

18 Claims, 7 Drawing Sheets

(56) References Cited

U.S. PATENT DOCUMENTS

| | | | |
|---|---|---|---|
| 7,877,333 | B2 | 1/2011 | Macready |
| 9,537,953 | B1 | 1/2017 | Dadashikelayeh et al. |
| 10,275,422 | B2 | 4/2019 | Israel et al. |
| 2002/0188578 | A1 | 12/2002 | Amin et al. |
| 2003/0105805 | A1† | 6/2003 | Jorgenson |
| 2003/0169041 | A1 | 9/2003 | Coury et al. |
| 2008/0116449 | A1† | 5/2008 | Macready et al. |
| 2011/0022820 | A1 | 1/2011 | Bunyk et al. |
| 2013/0166353 | A1 | 6/2013 | Mihic et al. |
| 2014/0201126 | A1 | 7/2014 | Zadeh et al. |
| 2014/0237457 | A1 | 8/2014 | Munshi et al. |
| 2014/0275807 | A1* | 9/2014 | Redei .................. A61B 5/0022 600/300 |
| 2015/0006443 | A1 | 1/2015 | Rose et al. |
| 2015/0046681 | A1 | 2/2015 | King |
| 2015/0106413 | A1 | 4/2015 | Ronagh |
| 2016/0011996 | A1 | 1/2016 | Asaad et al. |
| 2016/0224515 | A1 | 8/2016 | Ronagh et al. |
| 2017/0255872 | A1† | 9/2017 | Hamze et al. |

OTHER PUBLICATIONS

PCT International Search Report and Written Opinion, PCT Application No. PCT/US2018/020033, dated May 7, 2018, 18 pages.

Fadaei, S. "Mechanism Design via Dantzig-Wolfe Decomposition," arXiv preprint, 2015, arXiv:1508.04250.

Gunnerud, V. et al., "Dantzig-Wolfe Decomposition for Real-Time Optimization-Applied to the Troll West Oil Rim," IFAC Proceedings, Apr. 23, 2016, pp. 69-75, vol. 42, Issue 11, May be retrieve at<URL:https://pdfs.samanticscholar.org/d8d0/d74939b16ab798525ae0772d6f1186556542.pdf>.

Brian Wang, Publication Date Apr. 29, 2013, https://www.nextbigfuture.com/2013/04/sparse-coding-on-d-wave-hardware.html.†

* cited by examiner
† cited by third party

INTEGRATION OF QUANTUM PROCESSING DEVICES WITH DISTRIBUTED COMPUTERS

CROSS-REFERENCE TO RELATED APPLICATION(S)

This application claims priority under 35 U.S.C. § 119(e) to U.S. Provisional Patent Application Ser. No. 62/289,322, "Architecture for Integration of Quantum Processing Device with Distributed Computer," filed Jan. 31, 2016. The subject matter of all of the foregoing is incorporated herein by reference in its entirety.

BACKGROUND

1. Field of the Invention

This invention relates to the field of distributed computing, or computing over large sets of data, as well as to the field of quantum computing. More specifically, the invention comprises a software framework for integrating a quantum-based processing device with a large-scale software framework. In addition, the invention describes architectures and methodologies (via novel software algorithms and techniques) for integrating one or more quantum-based processing devices into classical architectures and software frameworks for distributed computing or computing over large sets of data.

2. Description of Related Art

Distributed Computing Architectures.

Many computational tasks require significant hardware resources in order to perform them in an efficient manner. For example, the Google search engine is powered by many thousands of computing machines across the world. In another instance, scientists may use thousands of processing devices to conduct experiments, such as performing simulations of physical systems. A central challenge of the active academic and commercial field of distributed computing is to determine how to most effectively use a multitude of available computational resources in order to solve a large-scale computational task.

Many early attempts at simultaneously harnessing many computing resources resulted in the construction of so-called "Beowulf" clusters, which are groups of commodity computers that communicate over a local area network and share libraries, programs, and processing. One innovation of Beowulf clusters is using commodity hardware, rather than specialized high-performance computing (HPC) devices. A user may run one large computational task that gets partitioned across all the computing devices in the cluster, or a user might run many smaller tasks across the cluster's various hardware resources. Examples of Beowulf clusters include the Wiglaf and Hrothgar clusters at NASA.

The idea of connecting many local computing resources also applies when those resources are specialized, not commodity, devices. Such clusters are often referred to as supercomputers. For example, the U.S. government's Excalibur and Lightning supercomputers are examples of clusters that have been built with architectures, hardware, and software specifically designed for the purpose of high-performance distributed computing.

A different approach to large-scale or distributed computing involves shared-memory systems. Shared-memory systems are single machines that physically combine a large number of hardware resources. For example, the SGI UV 3000 may have from 4 to 256 CPU sockets and up to 64 terabytes of shared memory in a single physical system. To the end user, these shared-memory machines appear as a single hardware resource, which leads to different software paradigms for conducting large-scale or distributed computing. Graphics processing units (GPUs), such as those devices built upon the NVIDIA Maxwell architecture, can offer a shared-memory parallel architecture as well, having many computational tasks running at once while interacting with a common system memory.

Another distinct architecture for distributed computing is the notion of grid computing. In this architecture, many computational resources that may be physically distant from one another are connected by means of a network. A distinctive feature of this distributed computing architecture is the large latencies that exist between resources in the grid. An end-user of a computing grid may run computational tasks on the grid, and in one realization, the tasks may be automatically distributed to the different resources in the grid by means of a centralized grid controller. Examples of the grid computing architecture include the Open Science Grid and the Berkeley Open Infrastructure for Network Computing (BOINC) system.

Big Data

"Big data" has become a popular term in media, academia, and commerce in recent years. Big data typically refers to large quantities of information, particularly information on which one may want to perform computations or from which one may want to glean insights. Examples of big data include the Facebook social graph and the collective historical data from stocks traded on the Nasdaq stock market. Big data has become an area of interest due to its growing presence and prominence in a wide variety of fields.

The natural challenge with big data is that, due to its size, complexity, and other intrinsic characteristics, it is difficult for humans and commodity machines (such as laptops) to perform analysis and otherwise manipulate, interact with, or compute using big data. In order for certain big data tasks to become feasible, or to make certain big data tasks more efficient, distributed computing architectures and software frameworks must be used. Any type of distributed computing architecture may be used to address big data challenges, though there must be appropriate software frameworks for performing these distributed computations in order to make computations feasible or more efficient.

Software Frameworks and Methodologies for Distributed Computing and Big Data

Historically, there have been parallel efforts to develop software frameworks and methodologies for these architectures. A popular fundamental software methodology for distributed computation is described by the Message Passing Interface (MPI) specification. The MPI standard, implemented by software libraries such as OpenMPI and MPICH, describes a system for exchanging data and information between a multitude of computational resources. As such, MPI is a popular technique for computing using Beowulf clusters and supercomputers.

Another methodology for distributed computing is described by the OpenMP application programming interface (API). OpenMP is designed for shared-memory systems and typically operates by splitting a larger computational task into many identical smaller tasks and running each of those smaller tasks in parallel on the system.

NVIDIA's CUDA library is one example of a software framework that allows for so-called heterogeneous computing, i.e. simultaneously using more than one type of hardware resource (in this case, CPUs and GPUs) to perform a computational task. The CUDA library may be combined with other distributed computing software frameworks and methodologies to orchestrate computational tasks across a distributed network of CPUs and GPUs. In a similar vein, Intel's Xeon Phi coprocessors and associated software development kits (SDKs) offer means for performing distributed computations in a heterogeneous environment.

Higher-level frameworks and methodologies include the MapReduce framework, as well as Hadoop and Apache Spark. MapReduce is described in e.g. U.S. patent application Ser. No. 10/871,244, "System and method for efficient large-scale data processing," filed Jun. 18, 2004. These frameworks are built on the premise of having access to a large number of simple commodity worker machines or specialized HPC resources. The frameworks automatically handle the task of distributing computation work to the various worker machines. The frameworks often also have APIs for collecting data from the worker machines. The ability to automatically distribute and collect data and information to and from the worker machines is an important differentiator of these higher-level frameworks and methodologies from lower-level examples like MPI, which require careful, manual specification of what data and information to exchange to, from, and among worker machines and how and when to exchange it. Thus, software frameworks for large-scale, distributed computation have been used to ease the programming burden when describing a computational problem which works in parallel over very large data sets.

Quantum Computing

Quantum computing was pioneered by theoretical physicists like Richard Feynman (see e.g. Feynman, 1982, Int. J. Theor. Phys. 21, 467, which is hereby incorporated by reference in its entirety). Quantum processing devices exploit the laws of quantum mechanics in order to perform computations. Quantum processing devices commonly use so-called qubits, or quantum bits, rather than the bits used in classical computers. Classical bits always have a value of either 0 or 1. Roughly speaking, qubits have a non-zero probability of existing in a superposition, or linear combination, of 0 and 1. Certain operations using and control systems for computing using qubits are further described in U.S. patent application Ser. No. 09/872,495, "Quantum Processing System and Method for a Superconducting Phase Qubit," filed Jun. 1, 2001, which is hereby incorporated by reference in its entirety.

Qualitatively speaking, the ability of qubits to exist in superpositions of 0 and 1 allows for greatly enhanced performance for certain computational tasks. For example, Shor's algorithm describes how a quantum computer can be used to efficiently factor large integers, which has significant applications and implications for cryptography. Grover's search algorithm describes how a quantum computer can be used to efficiently search a large set of information, such as a list or database. For fuller discussion, see e.g. Shor, 1997, SIAM J. of Comput. 26, 1484; Grover, 1996, Proc. 28th STOC, 212 (ACM Press, New York); and Kitaev, LANL preprint quant-ph/9511026, each of which is hereby incorporated by reference in their entireties.

Although people have been aware of the utility of quantum algorithms for many years, only in the past decade has quantum computing hardware begun to become available at practical scales. Examples of current-generation quantum processing devices include, but are certainly not limited to, the devices produced by D-Wave Systems Inc., such as the quantum processing devices (and devices built upon the architectures and methods) described in U.S. patent application Ser. No. 14/453,883, "Systems and Devices for Quantum Processor Architectures," filed Aug. 7, 2014 and U.S. patent application Ser. No. 12/934,254, "Oubit [sic] Based Systems, Devices, and Methods for Analog Processing," filed Mar. 23, 2009, both of which are hereby incorporated by reference in their entirety. Other quantum computing and quantum processing systems are under development by various companies, such as Google and IBM, though at present, D-Wave's quantum processing devices are the only physical quantum computer devices of useful scale for real-world problems.

Efforts in quantum computing to this point have relied on the use of individual quantum computing or processing devices to solve computational problems. There currently are few or no frameworks or methodologies that closely integrate a quantum processing device into the computational fabric of a distributed computing architecture. Existing frameworks typically rely on classical (non-quantum) processing devices, such as CPUs and GPUs.

Therefore, there is a need for the integration of quantum processing devices, which potentially provide significant benefits for many computational problems, with the computational fabric of a distributed computing architecture. There is also a need to develop frameworks and methodologies towards using quantum processing devices in a paradigm akin to classical distributed or high-performance computing.

SUMMARY

The present disclosure overcomes the limitations of the prior art by integrating quantum processing devices with conventional distributed computing paradigms, for example by providing an interface to quantum processing devices that is consistent with the forms otherwise used by or produced by conventional large-scale software frameworks like Apache Spark or Hadoop. In another aspect, it brings ideas from classical distributed and high-performance computing into the quantum processing domain. Various architectures and methodologies enable the bilateral integration of quantum processing devices and distributed computers.

In one aspect, a system is composed of a high-level API and library, a quantum data model, and a set of software processes to prepare this data model for computation on a quantum processing device and to retrieve results from the quantum processing device. This provides a way for distributed computing software frameworks to integrate one or more quantum processing devices into their workflow. A simple interface and/or an API is provided to the programmer or other end-user of the distributed computing or big data software framework. Internally, the software framework automatically builds a computation model which is stored in the master machine and updated by all worker machines. When the quantum device function is called, the model is used as a driver to generate inputs for the quantum computation device. These inputs are used to perform computations on the quantum processing device. Results of these computations are then read back from the quantum device via the same channel or different channels. The results are used to update the quantum data model. Finally, the distributed software framework is used to organize the updating of the worker machines with the updated computation model data.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

Figure 1:
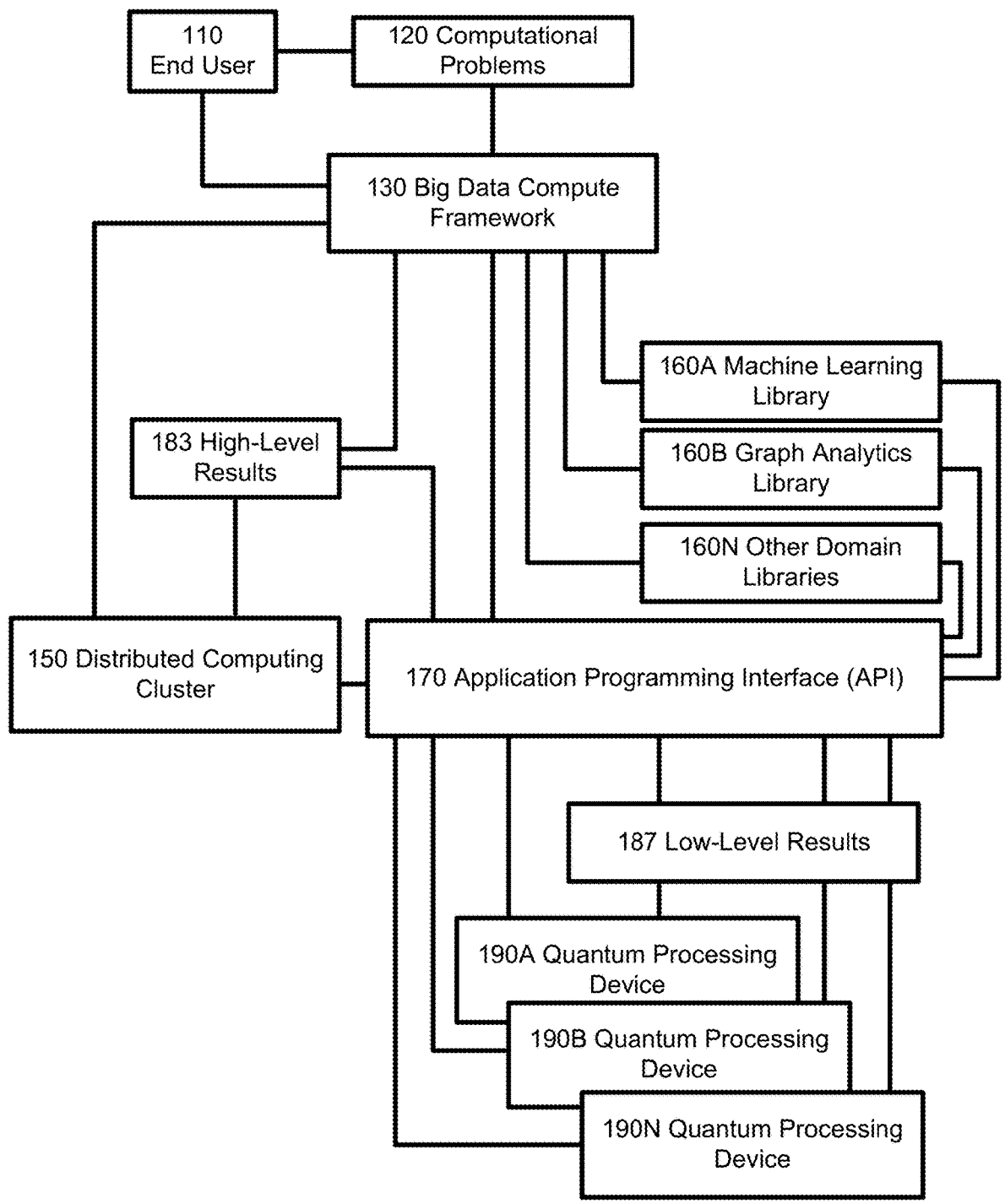
FIG. 1 is a logical diagram of a computing architecture and/or methodology described in accordance with an embodiment of the invention.

The same reference numerals in the drawings correspond to equivalent or identical parts appearing in the different drawings. The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Example Architecture

FIG. 1 is a logical diagram of a computing architecture and/or methodology described in accordance with an embodiment of the invention. Consider an optimization problem being solved. For example, the problem might be: given a set of package delivery drivers with their locations, a set of package delivery destinations, and a set of possible routes between drivers and destinations, what is the set of routes that the drivers can take that will allow all packages to be delivered in the shortest amount of time? This is a big data problem (in the domain of graph analytics) whose solution could well be sought using a distributed computing system and big data compute framework.

However, quantum processing devices are potentially very efficient at solving these types of problems. Throughout this document, a "quantum processing device" may be one or more physical devices that perform processing especially based upon quantum effects, one or more devices that act in such a way, one or more physical or virtual simulators that emulate such effects, or any other devices or simulators that may reasonably be interpreted as exhibiting quantum processing behavior.

Thus, it might be ideal to solve the entire problem on such a quantum computer. In order to expand the scale of the problem being solved, one way to solve this computational task is to partition the task into smaller sub-problems, some of which are solved on quantum processing devices and some of which are solved on classical distributed computers.

Referring to the computing system in FIG. 1, when the end user 110 enters the problem 120, the big data compute framework 130 distributes pieces of the problem (for instance, solving the delivery scheduling problem for particular cities rather than an entire state) to the quantum processing devices 190A-N as well as to classical distributed computers 150 available to the end user. In this example, the big data computer framework 130 functions as a master machine, and the quantum processing devices 190 and conventional computers 150 function as worker machines. Quantum processing devices 190 are employed via an API 170 (see e.g. FIG. 2) in order to solve some or all of these sub-problems, or the entire problem. Solutions 187 from the quantum processing devices 190 are returned through the API in an appropriate form 183 for the big data compute framework 130, allowing seamless execution of the problem in a heterogeneous environment involving both classical distributed computers 150 as well as quantum processing devices 190. The end result is a solution to the entire delivery scheduling problem, presented in a desired format 183 to the end user.

Process Flow

In the architecture of FIG. 1, an end user 110 describes a computational task 120, and then loads this problem 120 into a big data compute framework 130. The big data framework 130 has been extended (e.g., via a plugin interface) with an API 170 and libraries 160A-N. One or more domain-specific libraries (such as for machine learning 160A or for graph analytics 160B) may be used by the big data compute framework 130 to perform special operations (e.g., specially optimized routines or simplified, more specific versions of general-purpose routines). The libraries 160 aid or improve the big data compute framework's ability to solve computational tasks using quantum processing devices 190. Results of library function calls are passed to the provided API 170, which may also be directly called by the big data compute framework 130.

The API 170 then performs a series of steps in order to execute some or all of the given computational task on one or more quantum processing devices 190. This involves converting the task to a quantum data model, such that the task may be readily solved on a variety of quantum processing devices and architectures 190. When the quantum processing devices 190 return solutions 187 to the specified tasks, the provided API 170 returns these solutions in a format 183 amenable to the big data compute framework 130 or in a format that can be converted into a form amenable to the big data compute framework 130 through another software.

The distributed computing cluster 150 may directly or indirectly interface with the provided API 170 in order to, for example, communicate information about currently running tasks. One or more quantum processing devices 190 may be used within the architecture, just as any classical computing cluster 150 (which may be comprised of multiple clusters that the end user can access) can be used within the architecture.

Application Programming Interface (API)

Figure 2:
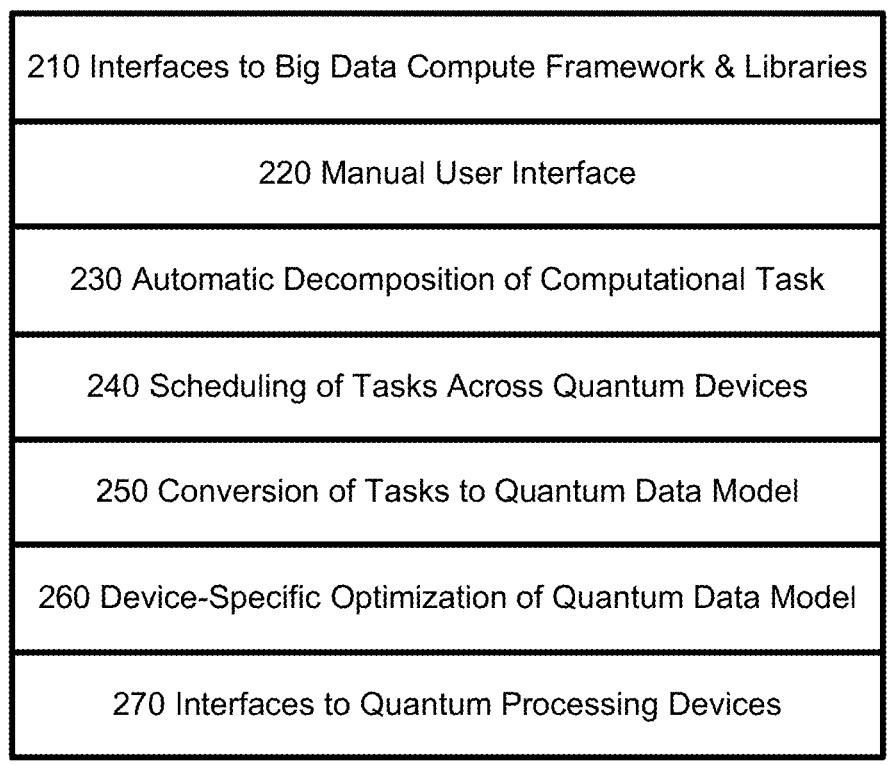
FIG. 2 is a logical diagram of an API described in accordance with one or more embodiments of the invention.
Figure 3:
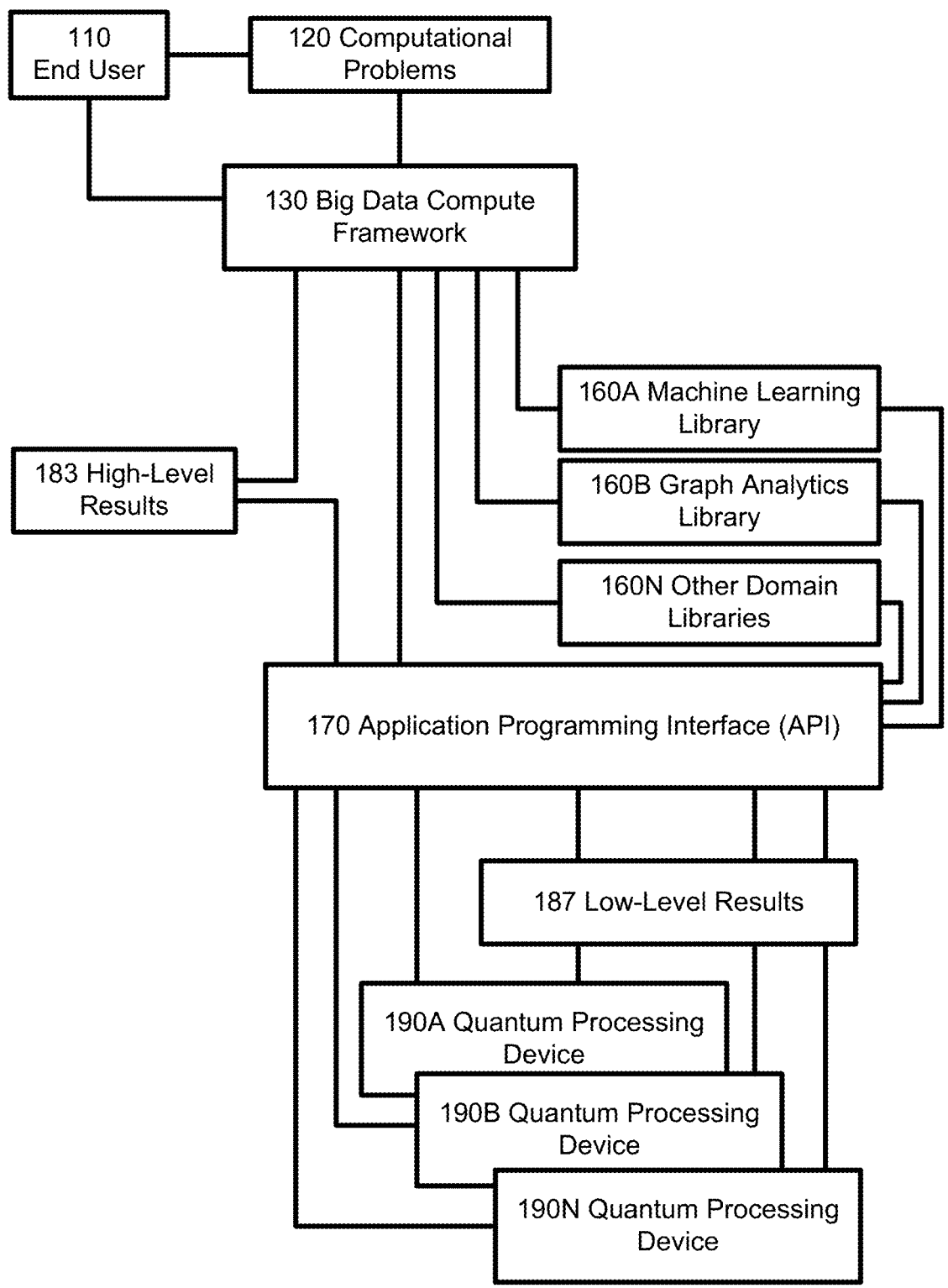
FIG. 3 is a logical diagram of a computing architecture and/or methodology described in accordance with another embodiment of the invention.

FIG. 2 is a logical diagram of an API described in accordance with one or more embodiments of the invention. In this example, the API 170 includes software 210 that allows integration with various big data compute frameworks (e.g., as a plugin for Apache Spark). The API 170 also has a manual user interface 220 that allows interaction with the API 170 without a big data compute framework (and enables development of interfaces to additional big data compute frameworks).

In one embodiment of the invention, the provided API 170 automatically determines 230 how to partition problems into smaller pieces amenable to solution on quantum computing devices 190, for example, by applying specially adapted classical problem decomposition heuristics for Traveling Salesman-like problems when the input problem is determined to resemble a Traveling Salesman problem. In another embodiment, the end user may manually specify some or all of the instructions on how to decompose or partition a larger computational task into smaller pieces that fit within the memory of a quantum computing device.

The API 170 also includes an internal task scheduler 240 that is tuned for the many distinguishing characteristics of quantum computing devices.

The API 170 also includes a module 250 for conversion of an input computational task into a realization of a quantum data model. This conversion may be fully manual, partially automated, or fully automated, in different embodiments. The realization of the task using quantum data model is a representation of the task in a manner that makes the problem amenable to solution on a particular quantum processing device 190. For example, in one embodiment, this module might involve automatic conversion of an arbitrary optimization problem into a quadratic unconstrained binary optimization (QUBO) problem, for solution on a D-Wave quantum processing device (which is largely designed for solving that specific type of problem).

Another feature of the API 170 involves a suite of software algorithms and routines 260 for optimizing the realization of the computational task upon the quantum data model for execution upon a particular quantum processing device. This optimization may be fully manual, partially automated, or fully automated, in different embodiments. Following the above example, the API may know that one quantum computer has a different architecture than another quantum computer. Using this knowledge, the API 170 can tune particular aspects of the problem, the underlying data model, settings of the solution method, etc. so that the task is solved in an optimal or near-optimal way on the quantum processing device.

Finally, the API 170 includes interfaces 270 to various quantum processing devices. These may include adiabatic quantum computing devices, quantum annealing devices, gate-model quantum computing devices, or other processing devices that use quantum effects in order to obtain solutions to computational problems. This component 270 of the API is capable of both distributing tasks to various quantum processing devices as well as reading returned solutions from the devices.

FIG. 2 is just one example of an API 170. Other examples may have less than all the modules 210-270 shown in FIG. 2 and/or may have additional modules not shown. Typically, the API 170 will include an interface 210 to the master machine, an interface 270 to the quantum processing devices, and some sort of API stack (modules 220-260 in this example) between the two interfaces.

More Example Architectures

FIGS. 3-6 are logical diagrams of more example computing architectures and/or methodologies described in accordance with additional embodiments of the invention. In the computing system of FIG. 3, no classical distributed computers (150 in FIG. 1) are used. The big data compute framework 130 is used solely in conjunction with quantum processing devices 190 via the provided API 170 and libraries 160.

Figure 4:
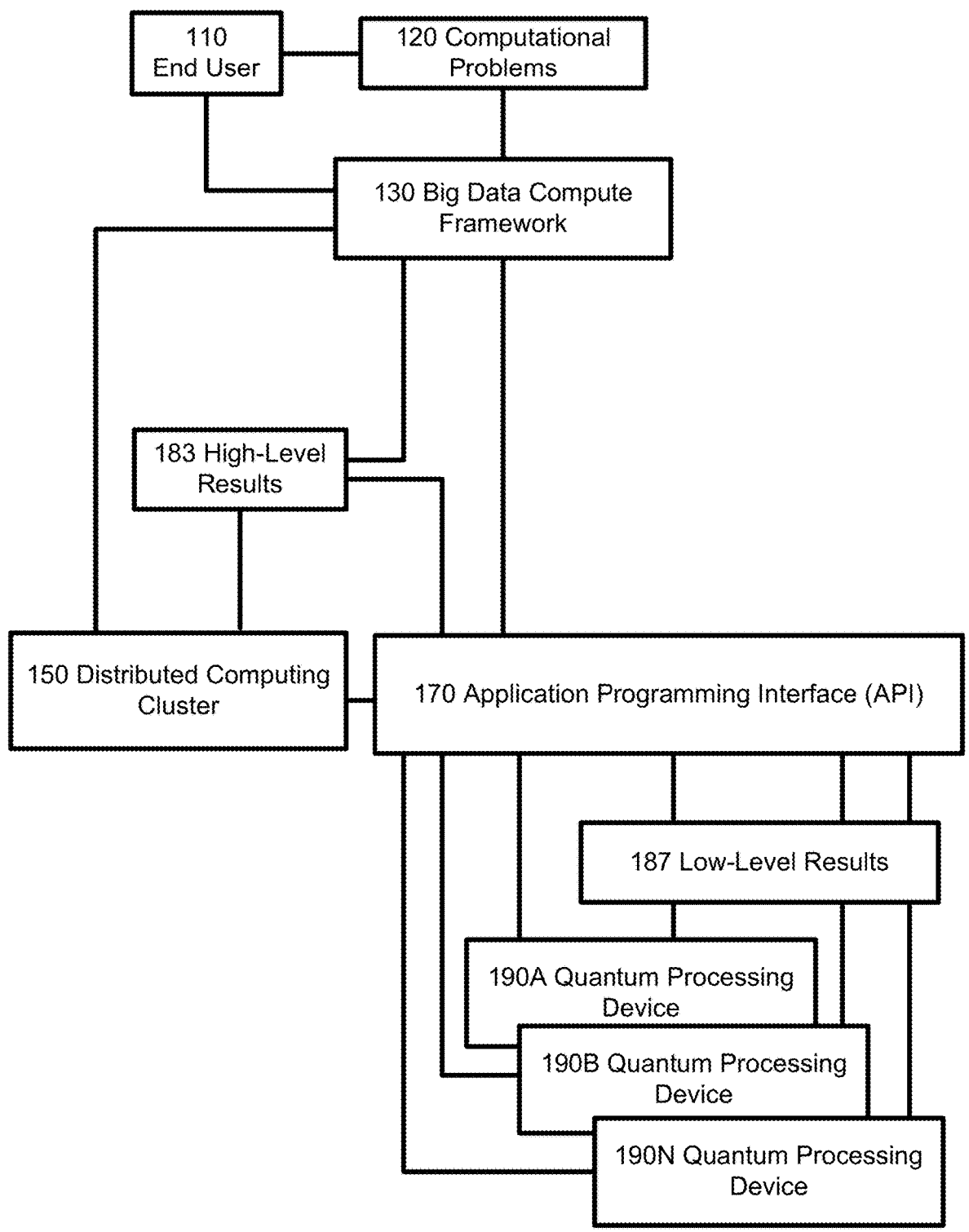
FIG. 4 is a logical diagram of a computing architecture and/or methodology described in accordance with yet another embodiment of the invention.

In the computing system of FIG. 4, none of the domain-specific libraries (160 in FIG. 1) are used by the big data compute framework 130 or provided API 170 when performing the given computational tasks. This architecture demonstrates that the API and associated integrations may be used without specific use of the provided domain-specific libraries.

Figure 5:
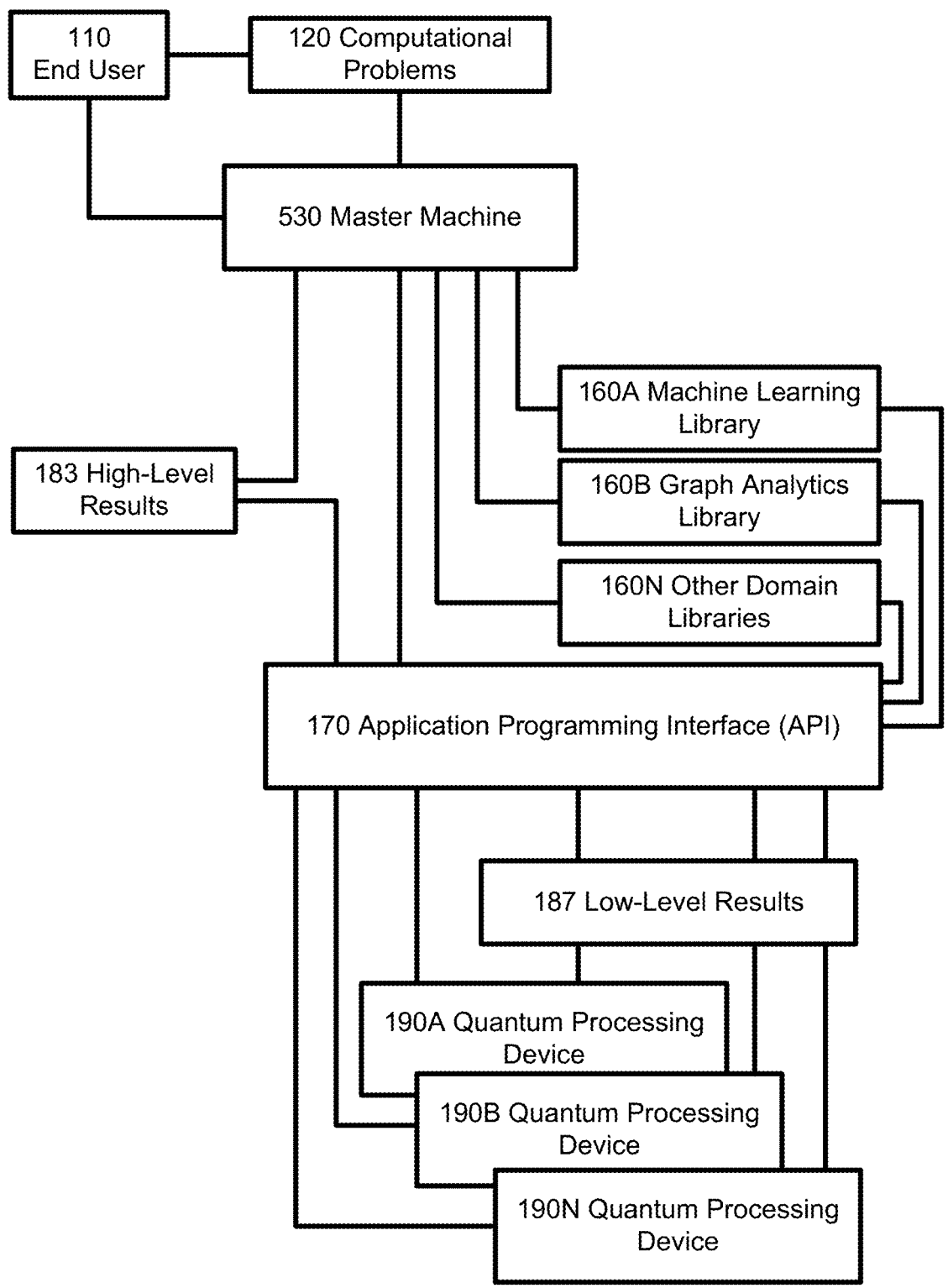
FIG. 5 is a logical diagram of a computing architecture and/or methodology described in accordance with yet another embodiment of the invention.

In the computing system of FIG. 5, the provided API 170 and libraries 160 are used to solve a computational problem without use of a big data compute framework (130 in FIG. 1) or other distributed computing resources (150 in FIG. 1). In this example, a master machine 530 controls the worker quantum processing devices 190. This example demonstrates a framework for distributed computation across a set of quantum processing devices 190 without using the integration provided for big data compute frameworks.

Figure 6:
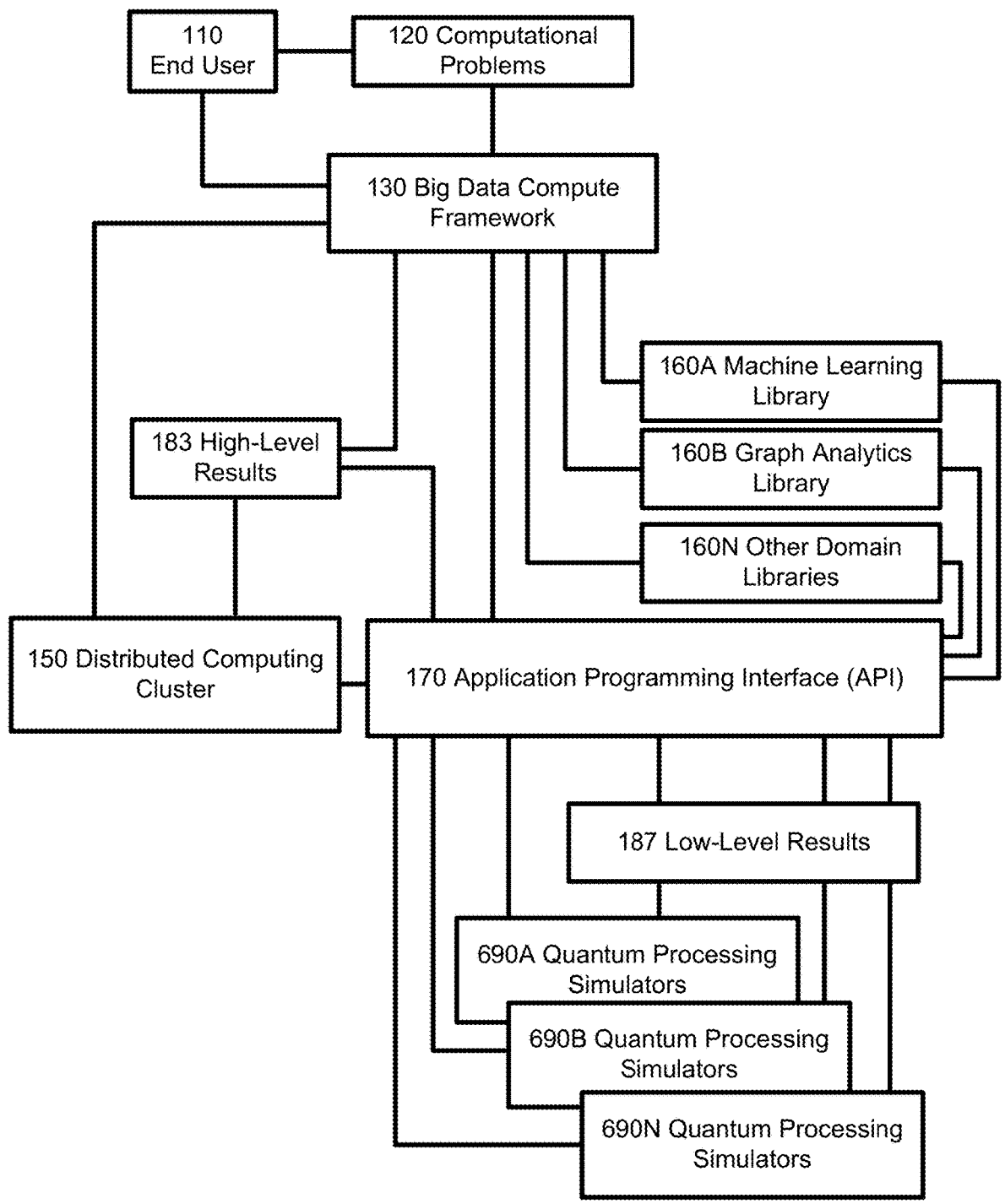
FIG. 6 is a logical diagram of a computing architecture and/or methodology described in accordance with yet another embodiment of the invention.

In the computing system of FIG. 6, quantum processing simulators 690 are used rather than quantum processing devices 190. Quantum processing simulators 690 are generally virtual quantum processing devices that execute virtually within a classical computing device. Quantum processing simulators 690 may be used, for example, to execute quantum algorithms when quantum processing hardware is not available to the end user. Since quantum processing simulators 690 behave in the same way as physical quantum processing devices 190, the API 170 may interoperate with quantum processing simulators 690 or physical quantum computing devices 190, or a combination of the two.

Additional Variations

The approaches described above may be used to solve various computational problems and tasks, in whole or in part. In one embodiment, partial components of a larger computational task are executed by the quantum processing devices. In another embodiment, the entire computational task is executed by the quantum processing devices. Additionally, while these examples use two specific domain-specific libraries 160A,B, there is no restriction on what domains may admit useful libraries 160 for inclusion into this computing framework. Furthermore, while the drawings display a single computational problem 120, that computational problem or task may in fact be comprised of many computational problems or tasks that the end user may wish to execute in serial or in parallel.

Figure 7:
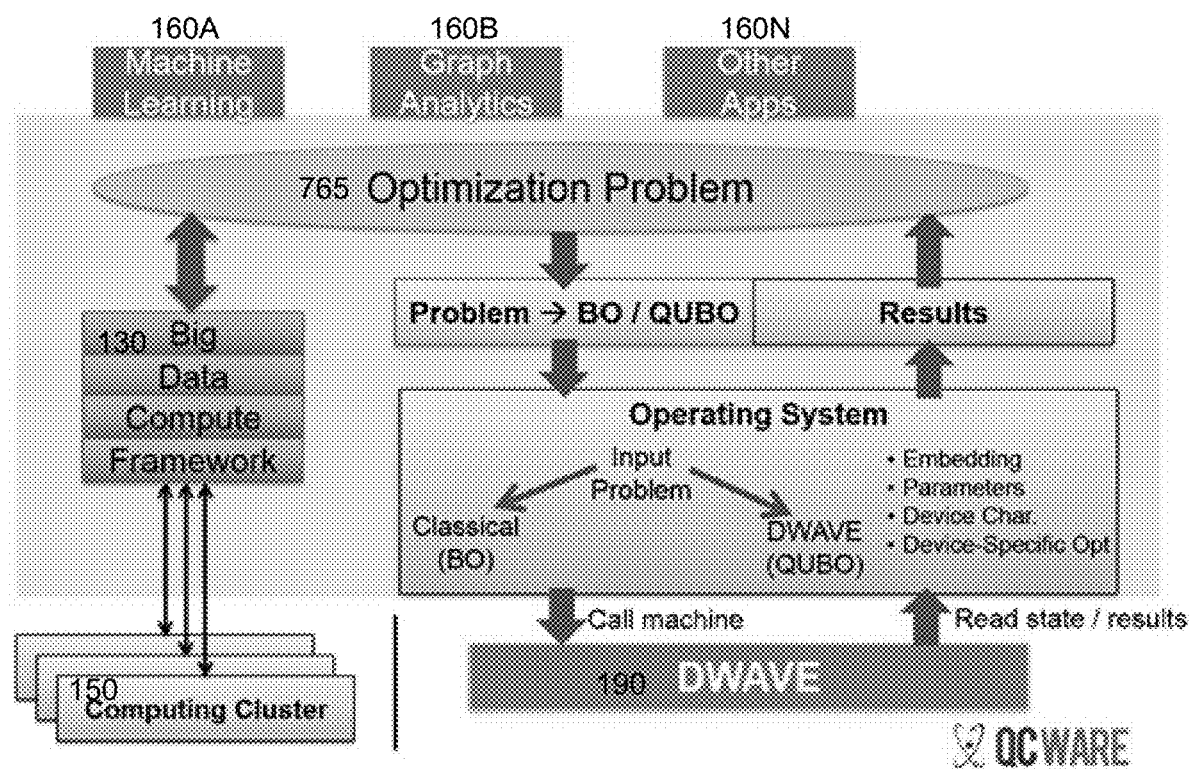
FIG. 7 is a logical diagram of a computing architecture and/or methodology described in accordance with yet another embodiment of the invention.

In yet another embodiment shown in FIG. 7, the computing architecture is composed of a high-level API and library, a quantum data model 765, and a set of software processes to prepare this data model for computation on a quantum processing device 190.

In this embodiment, the high-level API and library are built as an extension to the existing parallel framework API. This extended API gives the programmer simple control of when to initiate use of the software processes to generate a quantum computational input. In FIG. 7, the library calls are available at the level of the software blocks 160A-N titled "Machine Learning" "Graph Analytics" and "Other Apps". These are application areas that could make use of the quantum processing device as a co-processor.

In this embodiment, the existing large scale software framework partitions parallel workloads to worker machines as usual. This is modeled in FIG. 7 by the blocks titled "Big Data Compute Framework" 130. Internally, the architecture involves modifying the master (controlling) machine to contain a quantum data model. In FIG. 7, the data model is represented by the block 765 titled "Optimization Problem." This data model 765 is stored on the master machine during computation and is used to aggregate computation results from all the worker machines in the system.

In this embodiment, the master machine occasionally uses the quantum data model 765 to generate appropriate input for the quantum processing device 190. A common paradigm in many computer algorithms is to generate quantum inputs (effectively calling the quantum processing device to perform computation) once per algorithm iteration. The quantum processing input is generated by running the data model through software processes that automate the generation of the appropriate input for the quantum processing device. In FIG. 1, these software processes are represented by the flow of data from the "Optimization Problem," through the "Problem→BO/QUBO" and "Operating System" blocks, and to the "DWAVE" block 190 (an example of a quantum processing device). Results of computation are then read back from the quantum processing device 190 via the same channel. The results are used to update the quantum data model. Finally, the distributed software framework is used to organize the updating of the worker machines with the updated computation model data.

Although the detailed description contains many specifics, these should not be construed as limiting the scope of the invention but merely as illustrating different examples and aspects of the invention. It should be appreciated that the scope of the invention includes other embodiments not discussed in detail above. For example, one may include multiple large-scale software frameworks in various configurations in the architectures described above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A computing system comprising:
   a master machine;
   a physical quantum processing device that functions as a worker machine controlled by the master machine, wherein said physical quantum processing device is a gate-model quantum computing device;
   an API stack, that provides an interface for the master machine to control any of a plurality of different types of conventional computers and quantum processing devices including said physical quantum processing device, comprising:
      an interface communicating with the master machine using a conventional software form, including receiving a problem from the master machine and sending results based on the problem to the master machine using the conventional software form;
      an interface to said physical quantum processing device, including configuring the problem on said physical quantum processing device and receiving low-level results based on the problem from said physical quantum processing device;
      a conversion module that (A) converts the problem received from the master machine in conventional software form to a quantum data model amendable to solution on quantum processing devices including said physical quantum processing device; and (B) converts the low-level results based on the problem received from said physical quantum processing device to the conventional software form to send to the master machine; and
      a device-specific optimization module that optimizes the quantum data model for solution on said physical quantum processing device; and
   a domain-specific library containing routines to prepare the problem within a domain for solution by said physical quantum processing device, wherein the master machine calls the routines using conventional software calls and results of the routines are passed to the API stack, wherein the domain-specific library is a machine learning library.

2. The computing system of claim 1 wherein the API stack includes a module that decomposes the problem received from the master machine into computational tasks, wherein at least one of the computational tasks is assigned to be computed by said physical quantum processing device.

3. The computing system of claim 1 wherein the API stack includes a module that schedules computational tasks to be computed by said physical quantum processing device.

4. The computing system of claim 1, wherein the API stack includes a module that allocates tasks among the quantum processing devices.

5. The computing system of claim 1 wherein the API stack includes a manual user interface for a module that allocates tasks among the quantum processing devices.

6. The computing system of claim 1 further comprising another domain-specific library that is a graph analytics library.

7. The computing system of claim 1 wherein the master machine includes a big data compute framework.

8. The computing system of claim 1 further comprising:
   a distributed computing cluster that functions as a worker machine controlled by the master machine, the master machine allocating tasks between the distributed computing cluster and the physical quantum processing device.

9. The computing system of claim 1 wherein the API stack is a plug-in to the master machine.

10. The computing system of claim 1 wherein the physical quantum processing device is located remotely from the master machine.

11. A non-transitory computer readable medium containing:
   an API stack that provides an interface for a master machine to control any of a plurality of different types of conventional computers and quantum processing devices including a physical quantum processing device, the API stack comprising:
      an interface communicating with the master machine using a conventional software form, including receiving a problem from the master machine and sending results based on the problem to the master machine using the conventional software form;
      an interface to said physical quantum processing device, wherein said physical quantum processing device is a gate-model quantum computing device, including configuring the problem on said physical quantum processing device and receiving low-level results based on the problem from said physical quantum processing device;

a conversion module that (A) converts the problem received from the master machine in conventional software form to a quantum data model amendable to solution on quantum processing devices including said physical quantum processing device; and (B) converts the low-level results based on the problem received from said physical quantum processing device to the conventional software form to send to the master machine; and a device-specific optimization module that optimizes the quantum data model for solution on said physical quantum processing device; and a domain-specific library containing routines to prepare the problem within a domain for solution by said physical quantum processing device, wherein the master machine calls the routines using conventional software calls and results of the routines are passed to the API stack, wherein the domain-specific library is a machine learning library.

12. The non-transitory computer readable medium of claim 11 wherein the API stack further comprises:

a module that allocates tasks among the quantum processing devices.

13. The non-transitory computer readable medium of claim 11 wherein the API stack is accessible from any of a plurality of remotely located master machines.

14. The non-transitory computer readable medium of claim 11 wherein the API stack further comprises:

a module that decomposes the problem received from the master machine into computational tasks, wherein at least one of the computational tasks is assigned to be computed by said physical quantum processing device.

15. The non-transitory computer readable medium of claim 11 wherein the API stack further comprises:

a module that schedules computational tasks to be computed by said physical quantum processing device.

16. The non-transitory computer readable medium of claim 11 wherein the API stack further comprises:

a manual user interface for a module that allocates tasks among the quantum processing devices.

17. The non-transitory computer readable medium of claim 11 further containing:

another domain-specific library that is a graph analytics library.

18. The non-transitory computer readable medium of claim 11 wherein the API stack is a plug-in to the master machine.

* * * * *